UNITED STATES PATENT OFFICE.

ANDRES G. LUNDIN, OF BOSTON, MASSACHUSETTS, ASSIGNOR TO THE BOSTON CAST STEEL CASTING COMPANY, OF SAME PLACE AND PORTLAND, MAINE.

MOLDING MATERIAL FOR MAKING METALLIC CASTINGS.

SPECIFICATION forming part of Letters Patent No. 632,579, dated September 5, 1899.

Application filed January 19, 1899. Serial No. 702,742. (No specimens.)

*To all whom it may concern:*

Be it known that I, ANDRES G. LUNDIN, a subject of the King of Sweden and Norway, residing in Boston, in the county of Suffolk and State of Massachusetts, have invented a new and useful Improvement in Molding Materials for Making Metallic Castings, of which the following is a specification.

This invention relates to sand molds used in the production of metallic castings, and particularly to such as are intended for use in the manufacture of steel castings, in which the melting-point is high.

It is the object of the present invention to produce a facing-sand which is more cohesive than that which is ordinarily employed, more easily manipulated, and which is not productive of gas.

My invention consists in a composition of matter comprising ingredients which when suitably mixed accomplish the result mentioned.

In carrying out my invention I take one gallon of water, one-half pint of flour, and one gallon of molasses leavings or returns and mix them together. I then take about one quart of this mixture and mix it thoroughly with eight quarts of finely-ground fire-sand.

The ingredient which is technically known in the trade as "returns" or sometimes as "molasses leavings" is a by-product of the process of producing whisky from molasses.

The above proportions need not be adhered to with absolute exactness; but the result of my experiments is that those proportions produce the best results.

The returns or molasses leavings is a very important ingredient inasmuch as it, aided by the flour, produces the exact cohesive or binding effect desired, while the returns do not produce or generate gas, thus making blow-holes, as has been found to be the case when molasses itself has been mixed with the sand.

It will be seen from the above that the molding or facing material when ready for use consists of the following ingredients and proportions in bulk: sand, thirty-two parts; water, sixteen parts; returns or molasses leavings, sixteen parts, and flour one part.

Having thus fully described my invention, what I claim, and desire to secure by Letters Patent, is—

1. The herein-described composition of matter to be used as a molding material for making metallic castings, consisting of sand, water, flour, and returns or molasses leavings, substantially as set forth.

2. The herein-described composition of matter to be used as a molding material for making metallic castings, consisting of thirty-two parts sand, sixteen parts water, sixteen parts returns or molasses leavings, and one part flour, substantially as set forth.

3. A composition of matter to be used for making metallic castings, comprising sand, water, and "returns" or molasses leavings, substantially as set forth.

ANDRES G. LUNDIN.

Witnesses:
HENRY W. WILLIAMS,
A. N. BONNEY.